US008392466B2

(12) United States Patent
Jiang et al.

(10) Patent No.: US 8,392,466 B2
(45) Date of Patent: Mar. 5, 2013

(54) METHOD AND APPARATUS FOR AUTOMATED PROCESSING OF A DATA STREAM

(75) Inventors: Shun Jiang, Beijing (CN); Kenneth M. Johns, Tampa, FL (US); James J. Rhodes, San Jose, CA (US); Hovey Raymond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 12/869,936

(22) Filed: Aug. 27, 2010

(65) Prior Publication Data
US 2012/0054247 A1     Mar. 1, 2012

(51) Int. Cl.
*G06F 17/30* (2006.01)
(52) U.S. Cl. .......... 707/797; 707/754; 707/755
(58) Field of Classification Search .......... 707/754, 707/797, 791, 802, 755; 709/246
See application file for complete search history.

(56) References Cited

U.S. PATENT DOCUMENTS

| | | | |
|---|---|---|---|
| 4,750,135 A | 6/1988 | Boilen | |
| 5,189,608 A | 2/1993 | Lyons et al. | |
| 5,754,782 A * | 5/1998 | Masada | 709/213 |
| 5,970,490 A * | 10/1999 | Morgenstern | 1/1 |
| 6,651,219 B1 | 11/2003 | Elliott | |
| 7,028,037 B1 * | 4/2006 | Agarwal et al. | 1/1 |
| 7,107,282 B1 * | 9/2006 | Yalamanchi | 707/754 |
| 7,231,394 B2 * | 6/2007 | Walker et al. | 1/1 |
| 7,487,168 B2 * | 2/2009 | Rys et al. | 1/1 |
| 7,493,305 B2 * | 2/2009 | Thusoo et al. | 1/1 |
| 7,836,098 B2 * | 11/2010 | Baby et al. | 707/803 |
| 2004/0193575 A1 * | 9/2004 | Chen et al. | 707/3 |
| 2004/0205082 A1 * | 10/2004 | Fontoura et al. | 707/101 |
| 2005/0060372 A1 | 3/2005 | DeBettencourt et al. | |
| 2005/0197931 A1 | 9/2005 | Gupta | |
| 2005/0228791 A1 * | 10/2005 | Thusoo et al. | 707/6 |
| 2006/0191993 A1 | 8/2006 | Markham et al. | |
| 2007/0130512 A1 | 6/2007 | Thielen et al. | |
| 2008/0097959 A1 * | 4/2008 | Chen et al. | 707/2 |
| 2008/0127149 A1 * | 5/2008 | Kosche et al. | 717/158 |
| 2008/0215559 A1 * | 9/2008 | Fontoura et al. | 707/4 |
| 2010/0146003 A1 * | 6/2010 | Bruso et al. | 707/797 |

OTHER PUBLICATIONS

Moran, Information Builders Partners With UBMatirx to Meet Customers' XBRL Reporting Requirements, Marketwire News Releases, May 19, 2009.

\* cited by examiner

*Primary Examiner* — Jean M Corrielus
(74) *Attorney, Agent, or Firm* — Lieberman & Brandsdorfer, LLC

(57) ABSTRACT

A method, system, and article for automated processing of a data stream are provided. Stream processing is applied to a hierarchical self describing data stream. As the data stream is processed, some elements therein are associated with a selected path expression. The selected path expressions are ordered based upon the hierarchy, and a tree structure is created that corresponds to the hierarchy. Each leaf node of the tree is associated with a logical operator or an expression to be applied to data processed from the data stream to the leaf node.

18 Claims, 10 Drawing Sheets

300

| Name | Path | Path Length |
|---|---|---|
| Overhead | A.B.C | 3 |
| Rate | A.D | 2 |
| Cost | A.E. | 2 |

FIG. 3

METHOD AND APPARATUS FOR AUTOMATED PROCESSING OF A DATA STREAM

BACKGROUND

1. Field of the Invention

This invention relates to processing a data stream in a computer system environment. More specifically, the invention relates to a hierarchical self describing data stream and efficiently evaluating the data.

2. Background of the Invention

In a data streaming environment, massive amounts of data are constantly written to the storage subsystem. Data must be periodically processed for evaluation or stored in a data storage medium and later removed from the data storage subsystem to free up space for new data. It is known in the art that all of the data in the streams cannot be permanently stored in the storage subsystem due to capacity issues, and as such, a protocol must be employed to delete data from the storage subsystem.

Distributed computer systems designed to handle large-scale data stream processing are evolving. With respect to streaming of data, or storage of large quantities of data in general, there are concerns with how to address capacity issues. In other words, data that is written to storage is generally maintained, and the data at some point is removed to make room for new data. Accordingly, there is a need for an efficient evaluation of data within the data stream in a single pass, as all of the data may not be retained in the storage to support processing the data multiple times.

BRIEF SUMMARY

This invention comprises a method, system, and article for evaluating and reporting on data in a data stream.

In one aspect of the invention, a method is provided for applying stream processing to a hierarchical self describing data stream. Selected elements in a data stream are each associated with a set of path expressions and an aggregation function, with the set of path expressions in the data stream being ordered based upon the self describing hierarchy. A tree structure is created with a correspondence of the structure to a hierarchical nature of the path expressions. The tree structure has a root node and one or more child nodes. A node with both a parent and at least one child is an interior node of a tree. A filter is created for each interior node of the tree. An aggregation object is associated with each path expression in order to provide support for manipulation of each data element satisfying the path expression according to an aggregation function.

In another aspect of the invention, a computer system is provided to process a data stream. The system includes a processor in communication with storage media. A data stream with multiple elements is provided together with a data stream manager to associate a path expression and a function with each element in the data stream, and to order the path expressions in the data stream. In addition, a tree structure corresponding to a hierarchical nature of the path expression order is provided. The tree structure includes a root node and at least one child node. Each interior node of the tree is associated with a filter. A director is provided in the system to associate a filter with each node and an accumulator object is provided for each accumulator node to support manipulation (according to an aggregation function) of each data element that satisfies a path expression.

In yet another aspect of the invention, an article is provided with a template for reporting on a data stream. The template comprises a layout for printing or display of template elements. Template elements include text and expressions; the expressions contain arguments. Each argument in an expression of a template is associated with data stream elements from a hierarchical self describing data stream that satisfy a specified path expression. In addition, a computer readable data storage medium is provided with computer program instructions configured to associate a path expression and a function with each of selected elements in the data stream. The instructions include instructions to order the selected path expressions and to create a tree corresponding to a hierarchical nature of the path expressions ordering. It is noted that the tree structure includes a root node and at least one child node. Each child, non-interior node that is a child of a node corresponding to the end of one of the path expressions is called an accumulator node. Instructions are also provided to create a filter for each interior node of the tree structure, and for each accumulator node, to associate an accumulator object to provide support for manipulation of each data element satisfying the corresponding path expression.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

FIG. 3 is a block diagram of an example excerpt from the data dictionary, including entries to define and determine overhead, rate, and cost.

DETAILED DESCRIPTION

Figure 1:
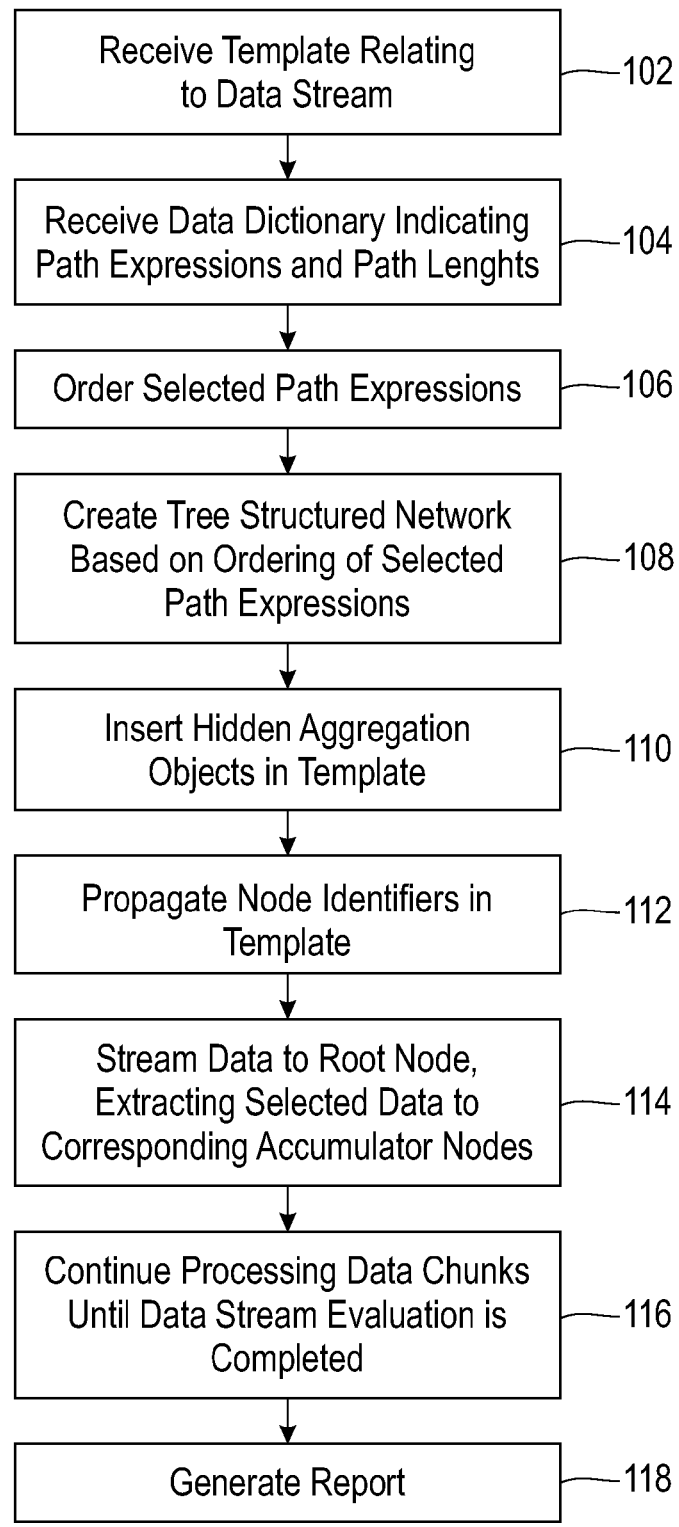
FIG. 1 is a flow chart illustrating a process for generating a report from data gathered from data stream processing, according to the preferred embodiment of this invention, and is suggested for printing on the first page of the issued patent.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers and directors. A manager and/or director may be implemented in programmable hardware devices such as field programmable gate arrays, programmable array logic, programmable logic devices, or the like. The manager and/or director may also be implemented in software for processing by various types of processors. An identified manager and/or director of executable code may, for instance, comprise one or more physical or logical blocks of computer instructions which may, for instance, be organized as an object, procedure, function, or other construct. Nevertheless, the executables of an identified manager and/or director need not be physically located together, but may comprise disparate instructions stored in different locations which, when joined logically together, comprise the manager and/or director and achieve the stated purpose of the manager and/or director.

Indeed, a manager and/or director of executable code could be a single instruction, or many instructions, and may even be distributed over several different code segments, among different applications, and across several memory devices. Similarly, operational data may be identified and illustrated herein within the manager and/or director, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a data stream manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Businesses and business owners have an ongoing need to process data in order to ascertain and/or determine relevant facts from the data. With respect to financial analysis, businesses have an underlying requisite to ascertain their financial health. In a merger or acquisition scenario, financial implications need to be addressed before the scenario is completed. Financial metrics are frequently a significant factor in completion of an acquisition. In one embodiment, financial metrics are presented in one or more reports based upon current data that may be accessed as hierarchically organized streaming data. For efficient processing of large quantities of data, including streams of data, operations on the data are not repeated. More specifically, data stream processing is applied to a hierarchical self describing data stream.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

Data stream processing is correlated with a template to localize processed data and to generate a report from the processed data. FIG. 1 is a flow chart (100) illustrating a process for generating a report from data gathered from data stream processing. Initially, a template is received that relates to the data in the data stream (102). More specifically, the template identifies selected elements in the data stream, and corresponding functions for manipulation of the selected elements. In one embodiment, the functions may be in the form of aggregation functions associated with the selected data elements. Following step (102), a data dictionary is received to indicate path expressions and path lengths for the selected elements (104). As noted above, the data stream may be in the form of a structured data stream with embedded path expressions. The received data dictionary defines each selected element by associating it with a path expression. Once the data dictionary has been received, the selected path expressions, i.e. the path expressions associated with the selected elements by the data dictionary, are ordered (106), and a structured tree network is created based upon the ordering of the selected path expressions (108). In one embodiment, the tree structure created at step (108) includes nodes within the tree that pertain to accumulator functions as identified in the template. More specifically, in order to localize the processing of data within the data stream, a filter is created and/or assigned to each node in the hierarchical structure of the tree. Each filter removes some of the data and passes the remainder to each of the children of the filter node. This application of the filters facilitates concurrent stream processing. Furthermore, the assignment of filters to the nodes of the tree organizes the filters in a hierarchical manner. At the same time, the correlation between the tree and the template includes insertion of one or more hidden aggregation objects in the template (110) and propagating node identifiers in the template (112). An element of the template is hidden when it is not printable. The hidden aggregation objects are placed in the template in order to keep their values close to the rest of the template for efficiency in printing or otherwise realizing a report from the template. Accordingly, prior to processing the data stream, the template and structured tree are organized and correlated.

Following step (112), data from the data stream may be processed. In one embodiment, the data stream includes a plurality of data chunks, with individual data chunks being processed through the tree structure. As data is streamed through the tree, it is initially received at the root node, after which it passes through the filter nodes and selected data is extracted to corresponding accumulator nodes where it is combined with at least one value from an aggregation object in the template by means of an aggregation function specified in the template (114). The processing of data chunks continues until the data stream evaluation is completed (116). Following completion of the data stream, a report is generated by propagating aggregation object values to mathematical expressions, evaluating the mathematical expressions, and generating an output from the resulting template (118). More specifically, each path expression is associated with an aggregation object to provide support for mathematical manipulation of each data element satisfying the path expression according to an aggregation function. Accordingly, the processing of the data stream supports efficient concurrent data processing as operations associated with the filters in the hierarchy are localized.

Figure 2:
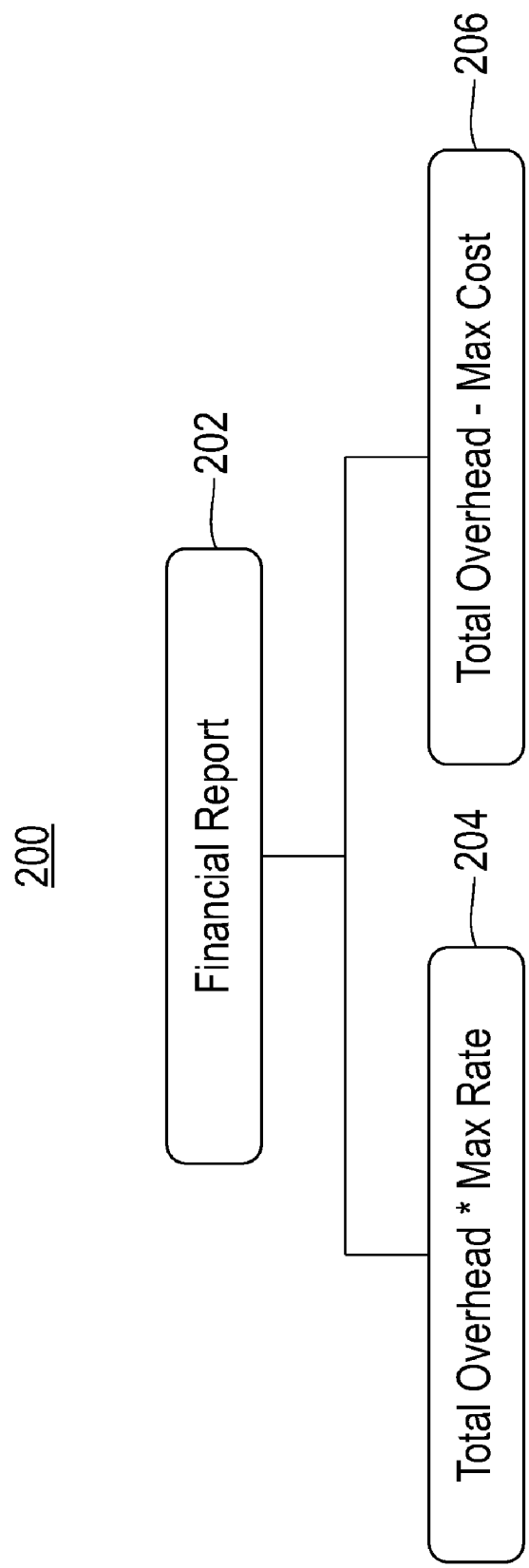
FIG. 2 is a block diagram of an example template, including layout and elements of text and mathematical expressions.

As referenced in FIG. 1, a template is received with elements of the template corresponding to aggregation functions. FIG. 2 is a block diagram (200) of an example template, including layout and elements of text and mathematical expressions. The template shown herein pertains to financial data to generate a financial report (202) with two separate aggregation functions (204) and (206). In this example, there are three data items that are considered important and are extracted from the data stream for processing, and they include overhead, rate, and cost. In the financial industry, overhead may refer to a part of manufacturing costs for which cost per unit produced is not readily assignable, rate may refer to a fixed charge per unit of quantity, and cost may refer to an outlay or expenditure of money, time labor, etc. As shown herein, one aggregation function (204) is summation (represented by a + in subsequent figures). This function corresponds to the key word "total." Another aggregation function (206) is maximum (represented by max in subsequent figures). This function corresponds to the key word, "maximum." In one embodiment, the template may include additional or alternative mathematical expressions. Accordingly, the scope of the invention should not be limited to the specific examples shown herein.

In FIG. 1, a data dictionary is received indicating path expressions and path lengths for selected elements, see step (104). FIG. 3 is a block diagram (300) of an example excerpt from the data dictionary, including entries to define and determine overhead, rate, and cost. As shown in this excerpt, there are three terms to be defined (310), including overhead (312), rate (314), and cost (316). For each dictionary term, there is a path (320) (consisting of a sequence of identifiers of tags used in the hierarchical structure of the data stream) that is associated with the defined term. More specifically, the path is defined based upon the structure of the path expressions as defined by tags embedded within the data stream. As shown in this example, overhead is defined as all filtered string data that occurs between tag <C> and </C> while this expression occurs between tag <B> and </B> and while the larger expression occurs between tag <A> and </A> (322). Similarly, rate is defined as all filtered string data that occurs between tag <D> and </D> while this expression occurs between tag <A> and </A> (324), and costs is defined as all filtered string data that occurs between tag <E> and </E> while this expression occurs between tag <E> and </E> (326). The data dictionary also includes an entry that defines the path length of each defined term (330). As shown in this example, the path length of overhead is three (332), the path length for rate is two (334), and the path length for cost is two (336). The path length reflects the quantity of tags in the data stream that are employed to define the associated term.

Figure 4:
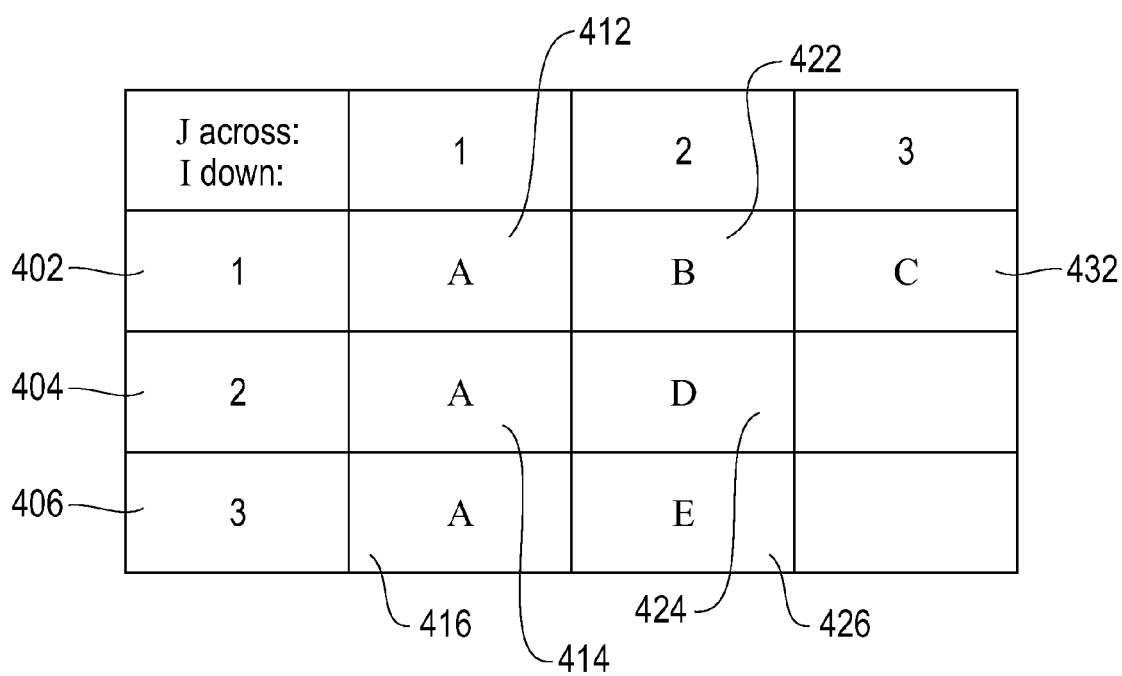
FIG. 4 is a block diagram of an example array.

Prior to processing a data stream, a two dimensional array associated with processing the data is initialized. FIG. 4 is a block diagram (400) of an example array. Each row (402), (404), and (406) of the array consists of a sequence of tag identifiers from one of the selected path expressions. More specifically, row (402) has a sequence of three tag identifiers (412), (422), and (432), row (404) has a sequence of two tag identifiers (414) and (424), and row (406) has a sequence of tag identifiers (416) and (426). These sequences have been ordered (106) in a lexicographic order. The ordering is chosen so that when a first sequence is an initial subsequence of a second sequence, the longer second sequence precedes the shorter first sequence in the ordering.

Figure 5:
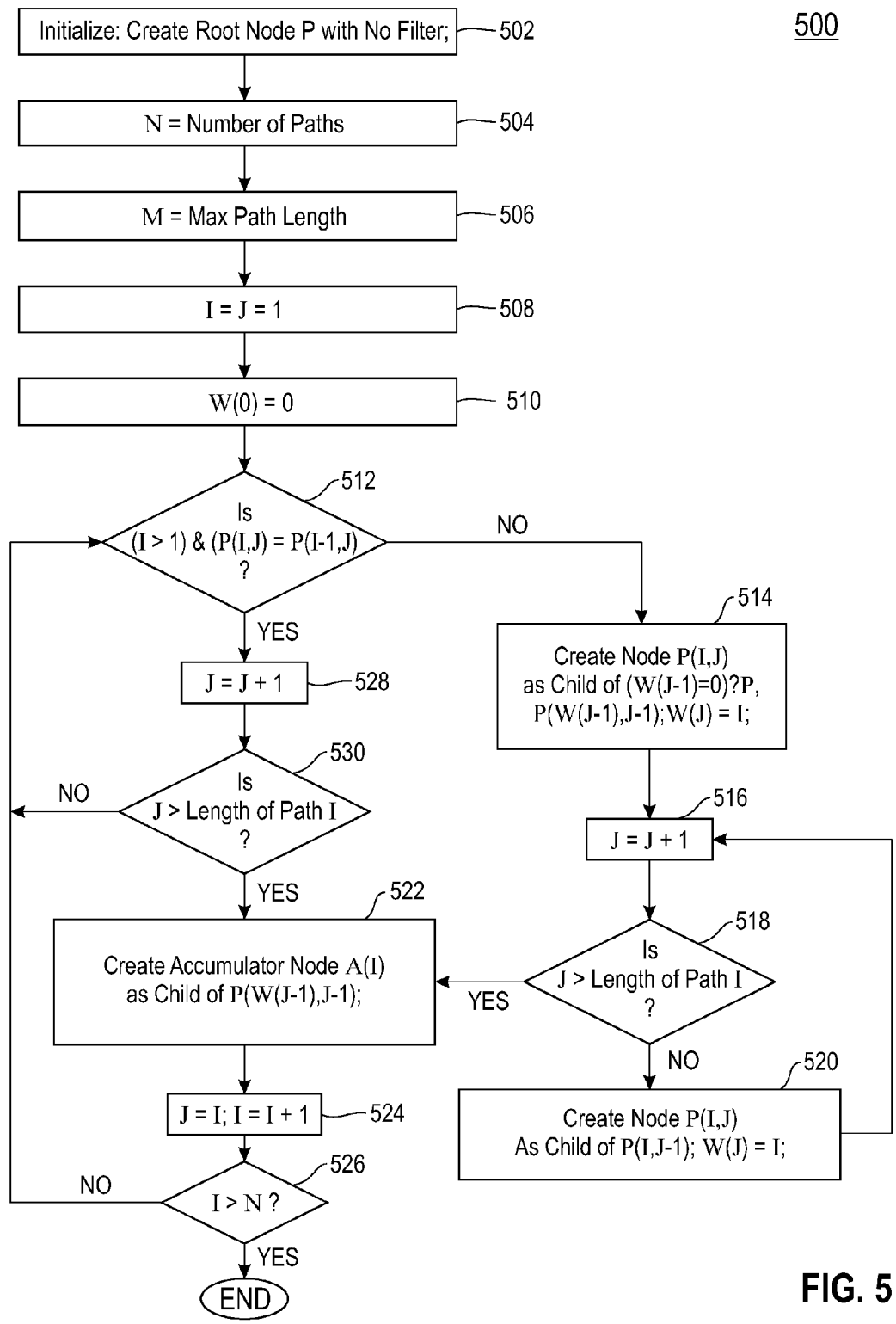
FIG. 5 is a flow chart illustrating conversion of a set of selected path expressions into a tree network of filter nodes and accumulator nodes.

Once the initialization is completed, as demonstrated in FIG. 4, a set of selected path expressions are converted into a tree network of filter nodes and accumulator nodes, as illustrated in flow chart (500) of FIG. 5. In an exemplary run of the conversion, the process is initialized by creating a root node, P, with no filter associated therewith (502), setting the variable N to the number of paths (504), setting the variable M to the maximum path length (506), setting variables I and J to the integer one (508), setting the function W(0) to zero (510), and initializing the two dimensional array P(*,*) with the sets of paths with one path for each row. In one embodiment, the paths are ordered lexicographically with longer paths preceding shorter sub-paths. Based upon the examples of FIG. 1-4, N is set to three, M is set to 3, and P(*,*) is set as shown in FIG. 4. Following completion of the initialization at step (510) control passes to test block (512) where it is determined if I is greater than 1 and P(I,J)=P(I−1, J). Since I is initially set to the integer one, control passes to block (514) where Node P(1,1)=A is created (with a filter that passes strings between tags <A> and </A>) as a child of P because W(J−1)=W(0)=0. Then W(J) is set to I, e.g. W(1) is set to 1. Following completion of the assignment at step (514), the variable J is incremented (516). Control then passes to step (518) where it is determined if the value of J is greater than the length of the path I. Based upon the example herein, J has a value of 2 and it is not greater than the length of the path I, which has a value of 3. A negative response to the determination at step (518) is following by creation of a node P(I,J) with a filter that passes strings between tags <B> and </B> as a child of P(I, J−1); and the function of W(J) is set to I (520). Following step (520), the process returns to step (516), where further nodes are created until the value of J is greater than the length of path I. Once there is a positive response to the determination at step (518), control passes to block (522) where an accumulator node A(1) is created as a child node of P(W(J−1), J−1), with the accumulator node having an aggregation function and no filter. Following the creation of the accumulator node at step (522), the variable J is set to the integer one and the variable I is incremented by a value of one (524). Once these settings are completed, it is determined if the value assigned to I is greater than the number of paths, N, (526). A positive response to the determination at step (526) completes the conversion process. Conversely, a negative response to the determination at step (526) passes control to step (512). Following a positive response to the determination at step (512), the variable J is incremented by one, and it is determined if the value of the variable J is greater then the length of the path I (530). A positive response to the determination at step (530) passes control to block (522). Conversely, a negative response to the determination at step (530) passes control to block (512).

Figure 6:
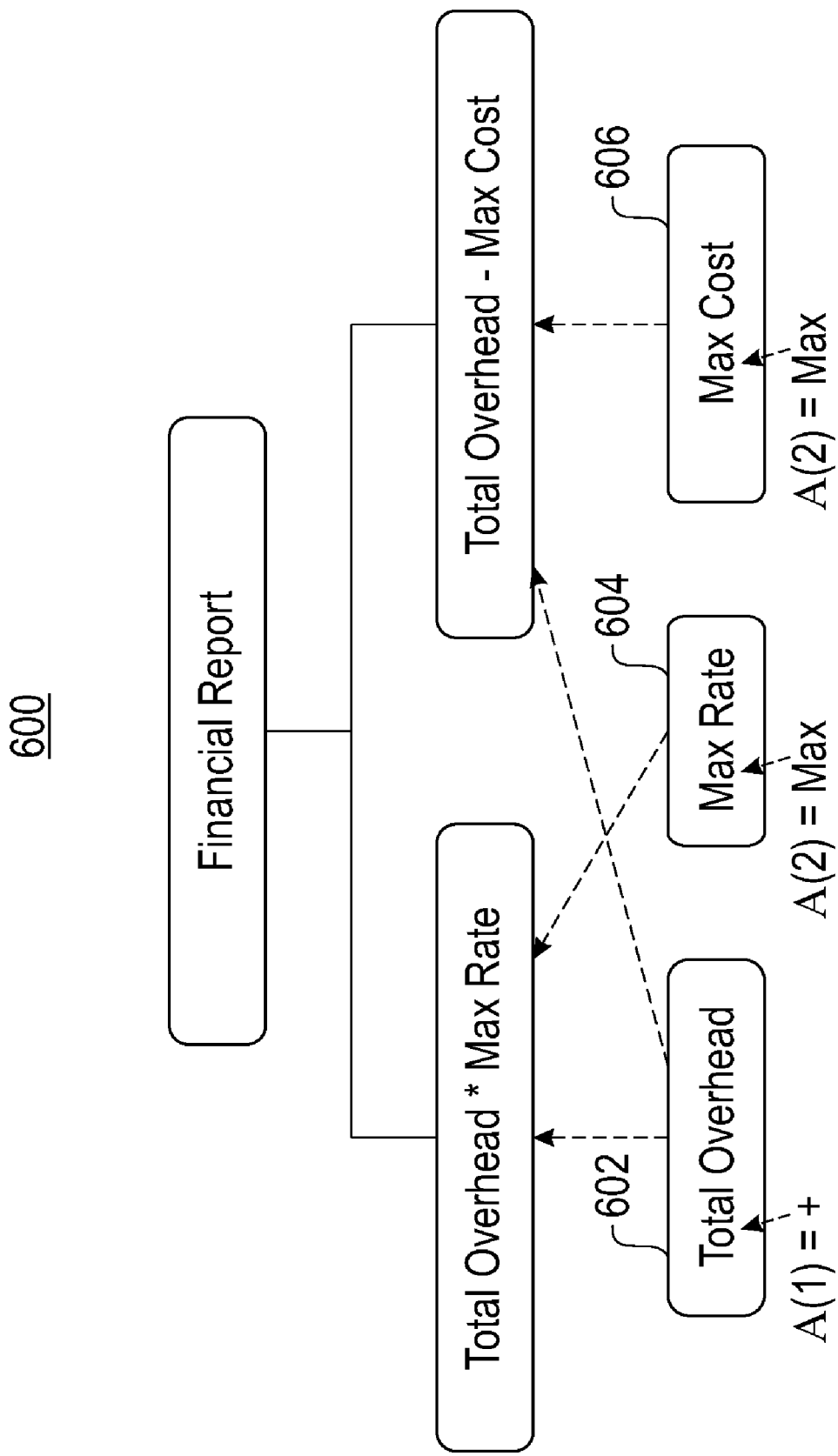
FIG. 6 is a block diagram illustrating insertion of hidden aggregation blocks into the template.

FIG. 6 is a block diagram (600) illustrating insertion of hidden (i.e. non-printable) aggregation objects into the example template according to step (110) of FIG. 1. The dashed arrows indicate how the aggregation blocks are chosen and how the corresponding aggregation functions are chosen. For example, the key word "total" next to the element "overhead" at block (602) indicates that an aggregation object must be inserted for "overhead," aggregating its values from the accumulation node corresponding to the path expression that defines "overhead," using the aggregation function "+" (i.e. addition). The key word "max" next to the element "rate" at block (604) indicates that an aggregation object must be inserted for "rate," aggregating its values from the accumulation node corresponding to the path expression that defines "rate," using the aggregation function "max" (i.e. maximum). Likewise, the key word "max" next to the element "cost" at block (606) indicates that an aggregation object must be inserted for "cost," aggregating its values from the accumulation node corresponding to the path expression that defines "cost," using the aggregation function "max" (i.e. maximum).

Figure 7:
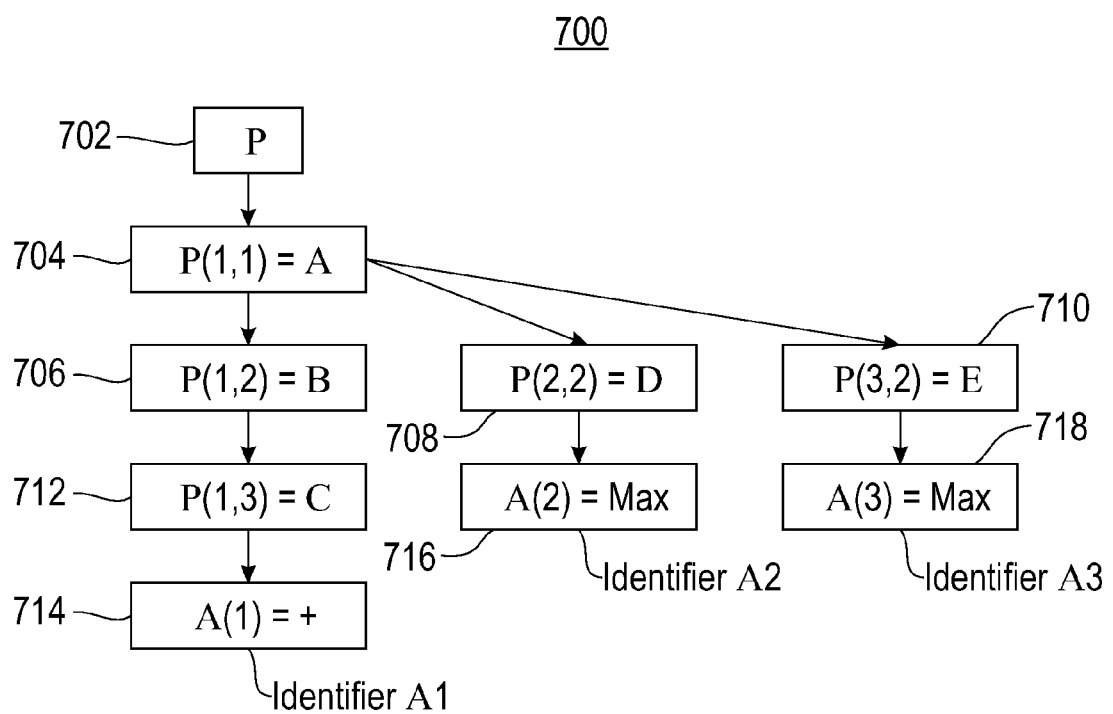
FIG. 7 is a block diagram showing a tree network of filter nodes and accumulator nodes resulting from applying the conversion of a set of selected path expressions into a tree network of filter and accumulator nodes.

FIG. 7 is a block diagram (700) showing a tree network of filter nodes and accumulator nodes resulting from applying the process of FIG. 5 to the examples of FIGS. 4 and 6. Each node of the tree network can be instantiated as a separate hardware processor or as a thread in a multi-threaded application. In both cases a data stream is fed to the root node (702). Data streams through the network asynchronously and concurrently. When data passes the filter of a filter node (704), it is sent via queues to all of the children (706), (708), (710), and (712) of the filter node. When data reaches an accumulator node (714), (716), and (718), it is aggregated to the data stored in the aggregation object by means of the aggregation function associated with the node. A filter network manager can signal a temporary end to the data stream, triggering propagation of the values stored in the aggregation objects to the mathematical expressions of the template, evaluation of the mathematical expressions, and generation of the report from the template with elements comprising text and evaluated mathematical expressions. The filter network manager can also signal erasing the values in the accumulation objects prior to signaling the start of another run of the same report. Alternatively, the filter network manager could signal a new input template and data dictionary for a new report. Note that multiple templates can be run simultaneously from the same data stream and that multiple pairs of aggregation functions and objects can take the place of one pair, if needed. Note also that when node P has only one child, node P can be eliminated from the tree network and its child can become the root of the network. In this case the root will also have a filter.

Figure 8:
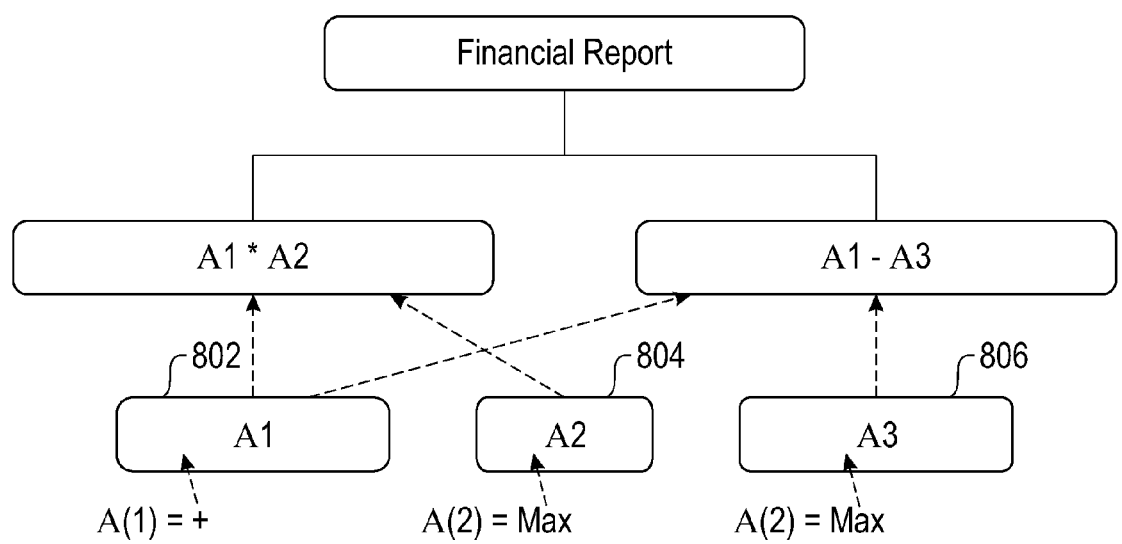
FIG. 8 is a block diagram showing propagation of node identifiers in a template

FIG. 8 is an illustration of step (112) of FIG. 1, propagating the node identifiers associated with aggregation objects to mathematical expressions in the template of FIG. 6. A1, as identified at (802), is the node identifier associated with the first aggregation object ("overhead"). A2, as identified at (804), is the node identifier associated with the second aggregation object ("rate"). A3, as identified at (806), is the node identifier associated with the third aggregation object ("cost"). According to step (112), these identifiers are propagated to the mathematical expressions, "overhead*rate" and "overhead−cost", yielding the new mathematical expressions "A1*A2" and "A1−A3", which are implicitly linked to the associated aggregation objects and ready for propagation of values.

Figure 9:
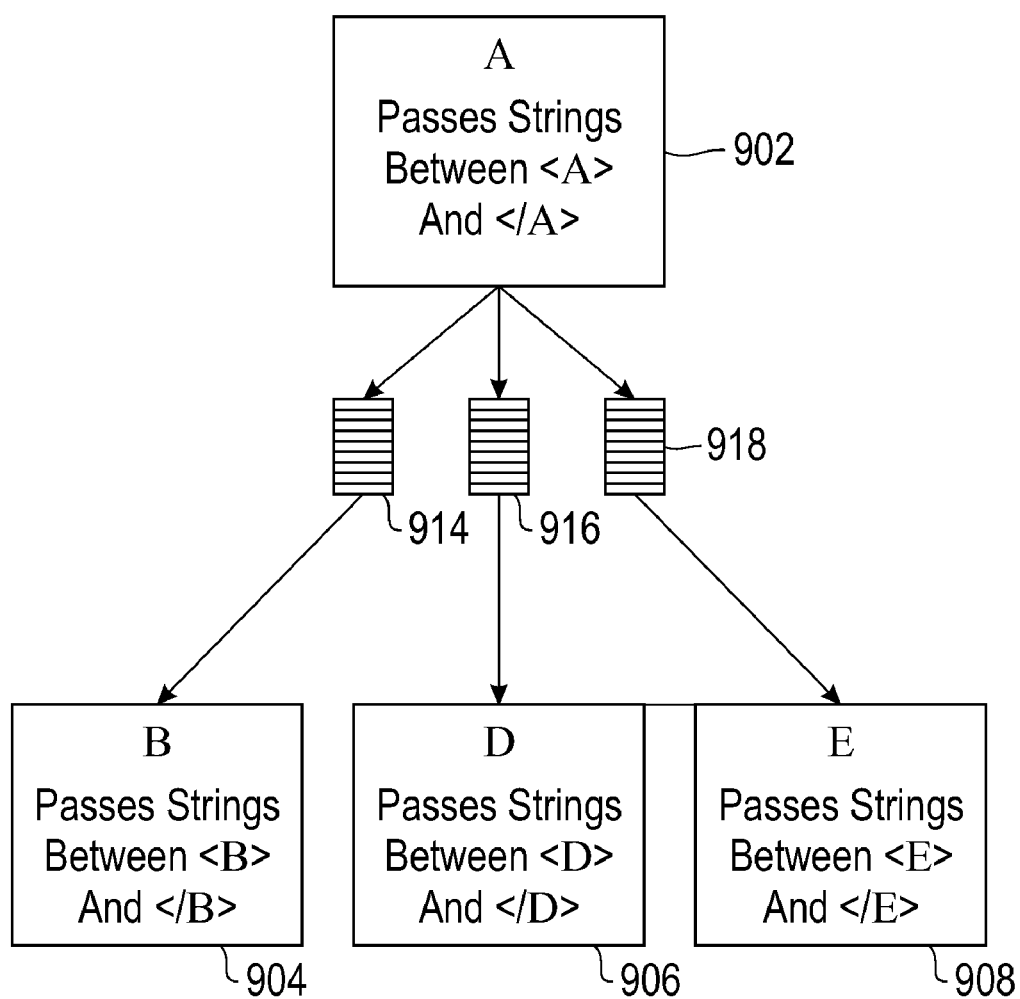
FIG. 9 is a block diagram showing inter-connection of nodes via queues.

FIG. 9 is a block diagram (900) showing how node A (902) is connected to node B (904), node D (906), and node E (908) via queues. As explained above, node A passes string data embedded between tags <A> and </A>. When data passes the filter of a filter node (902), it is sent via queues to all of the children. For example, node A passes string data to queue (914) of node B (904), queue (916) of node D (906), and queue (918) of node E (908). As shown, node B (904) passes string data embedded between tags <B> and </B>, node D (906) passes string data embedded between tags <D> and </D>, and node E (908) passes string data embedded between tags <E> and </E>.

Referring again to FIG. 7, we illustrate the functioning of stream processing on the following example XML data stream:

"<A><B><C>5</C></B><D>2</D><E>1</E><B><C>2</C></B><D>0</D><B><C>3</C><C>4</C></B></A>"

Before the data stream processing begins, the aggregations objects on the template are all initialized to A1.value=0, A2.value=0, A3.value=0. Node P passes the entire string to node A. Node A passes the parts of the stream after the first <A> and before the next </A>, which is the last </A> in this example. Thus Node A passes to nodes B, D, and E, the string "<B><C>5</C></B><D>2</D><E>1</E><B><C>2</C></B><D>0</D><B><C>3</C><C>4</C></B>". Node B passes the parts of the string that occur between <B> and </B> without intervening occurrence of </B>. Thus node B passes to node C the string "<C>5</C><C>2</C><C>3</C><C>4</C>". Node D passes "2" to node A2 then node D passes "0" to A2. Node E passes "1" to A3. Node C passes "5" to A1, followed by "2", "3", and "4" to A1. Node A1 sets A1.value=A1.value+5=0+5=5 on the template. Concurrently, node A2 sets A2.value=max(A2.value,2)=max(0,2)=2 on the template. Concurrently, node A3 sets A3.value=max (A3.value,1)=max(0,1)=1 on the template. Node A1 sets A1.value=A1.value+2=5+2=7. Node A2 sets A2.value=max (A2.value, 0)=max(2,0)=2. Node A1 sets A1.value=A1.value+3=7+3=10. Finally, node A1 sets A1.value=A1.value+4=10+4=14.

Continuing with the stream processing example and referring to FIG. 1 step 8, the stream is stopped and according to step 9, the values in the aggregation objects (A1.value=14, A2.value=2, and A3.value=1) are propagated to the mathematical expressions of the template which are then evaluated replacing the first mathematical expression by 14*2=28, and replacing the second mathematical expression by 14−1=13 in the template of FIG. 8. This template is then printed according to step 9 of FIG. 1.

Figure 10:
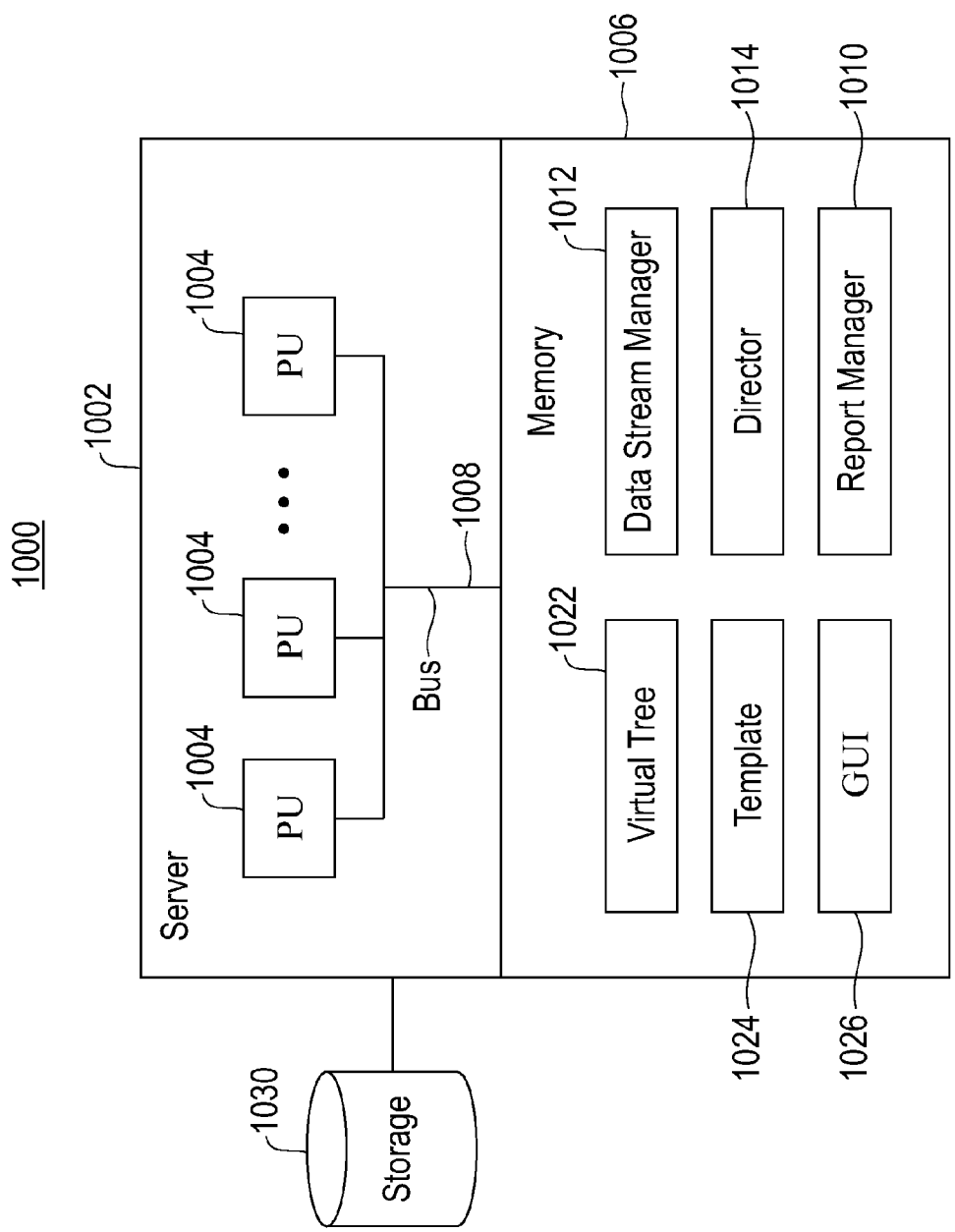
FIG. 10 is a block diagram of a computer system for processing the data stream and extracting relevant data from the input stream.

Processing of a data stream as described in FIGS. 1-8 and illustrated by way of an example in FIG. 9 may employ tools embedded in a computer system. As described above, an input stream of data is processed to identify and filter data segments, and to communicate these data segments to a template for further processing, generating a report, and/or storage. FIG. 10 is a block diagram (1000) of a computer system for processing the data stream and extracting relevant data from the input stream. As shown, a server (1002) is provided in communication with storage media (1030), which is employed to store data. The server (1002) includes multiple processing units (1004) in communication with memory (1006) across a bus (1008). Although multiple processing units (1004) are shown, the invention should not be limited to the quantity shown herein. A data stream is received by the server (1002), which employs one or more tools, including but not limited to managers, directors, filters, etc. to process the data stream for relevant data. More specifically, a virtual tree (1022) is organized to correspond to the hierarchical nature of the order of the path expressions. In one embodiment, the virtual tree (1022) has a root node and at least one child node. Similarly, in one embodiment, the virtual tree (1022) is local to memory (1006). As shown herein, the server (1002) includes memory (1006) with managers embedded therein. In one embodiment, the memory (1006) can be partitioned into separate memory units for parallel processing, in which case the virtual tree and queues would be distributed to various memory units while the managers, template (1024), and GUI (1026) would remain in one master memory unit.

The server is provided with two managers, a report manager (1010) and a data stream manager (1012), both of these managers are in communication with the processing units (1004). More specifically, the report manager (1010) is responsible for receiving and processing the template (1020) and data dictionary to produce the network of filter and accumulator nodes. In one embodiment, a graphical user interface (GUI) (1026) is provided local to memory (1006) to facilitate management of the template (1024) and data dictionary. More specifically, the GUI (1026) functions as an interface to the template (1024). The data stream manager (1012) is responsible for mapping the nodes of the virtual tree (1022) onto available processing units (1004). Each filter may be in the form of a thread in a multi-threaded program, with the program partitioned by the data stream manager (1012) into separate programs that run concurrently on a set of concurrent processors (1004) and communicate via queues (in memory) and via signals from the data stream manager (1012).

As demonstrated in the flow charts above, each node contains a unique identifier. The filtered data is received by each of the accumulator nodes, and through use of the identifier, is associated with a field of a template (1024). The template (1024) is employed to both mathematically manipulate the data and/or to organize the data for persistent storage thereof. In one embodiment, the report template may be transformed by replacing one or more elements in a formula of the results data with an identifier of a corresponding accumulator node of the virtual tree (1022), including data associated with aggregated data generated by an aggregator function. As noted above, the data stream manager (1012) evaluates the input data stream, and is employed to create the tree structure (1022). In one embodiment, the tree structure is not a static structure. More specifically, the tree structure (1022) may be modified to update one or more accumulator fields in the associated template (1024) as the data stream is being processed.

As identified above, the data stream manager (1012) and tree structure (1022) function to evaluate an input stream of data and to extract relevant information from the data stream for report generation. A director (1014) is provided in communication with the data stream manager (1012). The director (1014) serves to associate an accumulator object with each path query. The accumulator object provides support for mathematical manipulation of each data element that satisfies a path expression according to an accumulator function. In one embodiment, the manager(s) may reside as hardware tools external to local memory, or they may be implemented as a combination of hardware and software. Similarly, in one embodiment, the manager(s) may be combined into a single functional item that incorporates the functionality of the separate items. In one embodiment they may be collectively or individually distributed across the network and function as a unit to process one or more input streams of data. Accordingly, the manager(s) and director may be implemented as software tools, hardware tools, or a combination of software and hardware tools, to collect and organize data content.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include, but are not limited to, compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual processing of the program code, bulk storage, and cache memories which provide temporary storage of at least some program code in order to reduce the number of times code must be retrieved from bulk storage during processing.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening networks.

The software implementation can take the form of a computer program product accessible from a computer-useable or computer-readable medium providing program code for use by or in connection with a computer or any instruction processing system. In one embodiment, instructions are provided to process an input stream of data. More specifically, instructions are provided to process segments of data, identify the order of path expressions within the data stream, create a tree structure based upon the order of path expressions, and to create a filter for each node of the tree, wherein the filter(s) process the input stream. In addition, instructions are provided to associate an accumulator object with each path query. The accumulator object provides support for mathematical manipulation of each data element that satisfies a path expression according to an accumulator function. Furthermore, in one embodiment, a report template is created with multiple fields, wherein at least one field of the report template is associated with an identifier of a leaf node form the tree structure. Data processed from the accumulator nodes may be called to the template via the identifier. In one embodiment, the report template may be transformed to communicate result data associated with aggregated data that is generated by the aggregator function. This includes replacing each element in a formula of the result data with an identifier corresponding to a leaf node of the virtual tree (1022). Accordingly, instructions are provided to apply stream processing to a hierarchical self describing data stream.

Advantages

The method, system, and article for processing the data stream and generating a report supports processing an input stream through a tree of filters without repeating operations. More specifically, the filters restrict the data that is passed through the hierarchy while limiting the evaluation to a single pass of the data stream, thereby mitigating the requirement to store the input stream. Both calls to the data stream are restricted, as well as storage of data in persistent storage. These restrictions support efficient data processing that eliminates disk access.

Alternative Embodiments

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for applying stream processing to a hierarchical self describing data stream, comprising:
    associating selected elements in a data stream with a set of path expressions and a function;
    ordering the set of selected path expressions;
    creating a tree structure corresponding to a hierarchical nature of the path expressions ordering, the tree structure having a root node and at least one child node;
    creating a filter for each interior node of the tree structure, wherein an interior node is a node with both a parent and at least one child, said filter associated with a node to pass data elements corresponding to a path expression assigned to said node;
    passing data chunks supplied from the data stream through filters to extract selected elements, wherein the filters are organized into the tree structure and applied to the data stream according to the tree structure; and
    associating with each path expression an aggregation object to provide support for manipulation of each extracted data element satisfying the path expression according to an aggregation function applied to data elements extracted by said filters.

2. The method of claim 1, further comprising creating a report template identifying each data element to be aggregated into a report and identifying a corresponding aggregation function.

3. The method of claim 2, further comprising transforming the report template for communicating result data associated with aggregated data generated by the aggregation function, including replacing each element in a formula of the result data with an identifier of a corresponding accumulator node.

4. The method of claim 3, further comprising mapping each path expression in an associated template with the corresponding accumulator node of the tree structure.

5. The method of claim 4, further comprising updating one or more aggregation objects in the associated template as the data stream is processing.

6. The method of claim 5, further comprising creating a hidden area in the associated template for storing an updated aggregation object, hidden areas not appearing in printed or other realizations of a report generated from the template.

7. A computer system configured to process a data stream, comprising:
    a processor in communication with storage media;
    a data stream with multiple elements, and a data stream manager in communication with the processor, the data stream manager to associate a path expression and a function with each element in the data stream and to order the path expressions in the data stream;
    a tree structure corresponding to a hierarchical nature of the path expressions order, the tree structure having a root node and at least one child node;
    a filter for each interior node of the tree structure, wherein an interior node is a node within the tree structure having both a parent and at least one child, said filter associated with a node to pass data corresponding to a path expression assigned to said node;
    said filters to pass data chunks supplied from the data stream to extract selected elements, wherein the filters are organized into the tree structure and applied to the data stream according to the tree structure; and
    a director to associate with each path query for each leaf node an accumulator object to provide support for manipulation of each extracted data element that satisfies a path expression according to an accumulator function applied to data elements extracted by said filters.

8. The system of claim 7, further comprising a report template to identify each data element to be aggregated into a report and associating each data element with an aggregation function.

9. The system of claim 8, further comprising transforming the report template to communicate result data associated with aggregated data generated by the aggregation function, including replacement of each element in a formula of the result data with an identifier of the corresponding leaf node.

10. The system of claim 9, further comprising a map of each path expression in an associated template with the identifier of a corresponding leaf node of the tree structure.

11. The system of claim 10, further comprising an update manager to update one or more aggregation objects in the associated template as the data stream is processing.

12. The system of claim 11, further comprising a hidden cell in the associated template created to store data associated with an updated aggregation object.

13. An article for processing a data stream, the article having a template for reporting on the data stream, the template comprising:
    a layout for communication of template elements, wherein the template elements include text and expressions, and the expression include at least one argument:
    a non-transitory computer-readable storage medium storing instructions that when executed associate selected elements in a data stream with a set of path expressions and a function, the instructions comprising:
    instructions to order the path expressions; instructions to create a tree structure corresponding to a hierarchical nature of the path expressions ordering, the tree structure having a root node and at least one child node;
    instructions to create a filter for each interior node of the tree structure, said filter associated with a node to pass data corresponding to a path expression assigned to said node;
    instructions to pass data chunks supplied from the data stream through said filters to extract selected elements, wherein the filters are organized into the tree structure and applied to the data stream according to the tree structure; and
    for each leaf filter, instructions to associate with each path query an aggregation object to provide support for manipulation of each extracted data element satisfying a path expression according to an aggregation function applied to data elements extracted by said filters.

14. The article of claim 13, further comprising instructions to create a report template identifying each data element to be aggregated into a report and identifying a corresponding aggregation function.

15. The article of claim 14, further comprising instructions to support the report template for communicating result data associated with aggregated data generated by the aggregation function, including instructions to replace each element in a formula of the result data with an identifier of the corresponding leaf node.

16. The article of claim 15, further comprising instructions to map each path expression in an associated template with the identifier of a corresponding leaf node of the tree structure.

17. The article of claim 16, further comprising instructions to update one or more aggregation objects in the associated template as the data stream is processing.

18. The article of claim 17, further comprising instructions to create a hidden cell in the associated template for storing data associated with updated aggregation objects.

* * * * *